US008301386B1

(12) United States Patent
Redmond et al.

(10) Patent No.: US 8,301,386 B1
(45) Date of Patent: Oct. 30, 2012

(54) CLASSIFICATION AND WEB-BASED PRESENTATION OF OIL AND GAS SCADA DATA

(75) Inventors: Doug Redmond, Tulsa, OK (US); Ray McDaniel, Carthage, TX (US); Duane Sallee, Broken Arrow, OK (US)

(73) Assignee: eLynx Technologies, LLC, Tulsa, OK (US)

( * ) Notice: Subject to any disclaimer, the term of this patent is extended or adjusted under 35 U.S.C. 154(b) by 738 days.

(21) Appl. No.: 12/359,146

(22) Filed: Jan. 23, 2009

(51) Int. Cl.
*G01V 1/00* (2006.01)
*G06F 11/30* (2006.01)

(52) U.S. Cl. ........... 702/16; 702/182; 702/187; 702/188
(58) Field of Classification Search .................... 702/12, 702/16, 17, 182–189
See application file for complete search history.

(56) References Cited

U.S. PATENT DOCUMENTS

| | | | |
|---|---|---|---|
| 6,067,477 A * | 5/2000 | Wewalaarachchi et al. | 700/83 |
| 6,477,434 B1 * | 11/2002 | Wewalaarachchi et al. | 700/83 |
| 6,571,140 B1 | 5/2003 | Wewalaarachchi et al. | |
| 6,628,992 B2 | 9/2003 | Osburn, III | |
| 6,950,851 B2 | 9/2005 | Osburn, III | |
| 6,961,753 B1 | 11/2005 | Osburn, III et al. | |
| 7,225,248 B1 | 5/2007 | Osburn, III | |
| 7,424,399 B2 | 9/2008 | Kahn et al. | |
| 2002/0147503 A1 | 10/2002 | Osburn, III et al. | |
| 2002/0147808 A1 | 10/2002 | Osburn, III | |
| 2005/0007249 A1 * | 1/2005 | Eryurek et al. | 340/511 |
| 2007/0050157 A1 * | 3/2007 | Kahn et al. | 702/55 |

FOREIGN PATENT DOCUMENTS

| | | |
|---|---|---|
| AU | 1999-22332 A1 | 8/1999 |
| AU | 2011-7666 A1 | 1/2002 |
| AU | 1999-22332 B2 | 6/2002 |
| CA | 2317493 A1 | 8/1999 |
| CN | 1293780 | 5/2001 |
| EP | 1047998 A1 | 11/2000 |
| EP | 1047998 A4 | 1/2005 |
| JP | 2002-502072 A | 1/2002 |
| WO | WO 99-39276 A1 | 8/1999 |
| WO | WO 01-99078 A2 | 12/2001 |

* cited by examiner

*Primary Examiner* — Phuong Huynh
(74) *Attorney, Agent, or Firm* — Fernandez & Associates, LLP

(57) ABSTRACT

Disclosed are techniques for acquiring, processing and presenting data produced by one or more devices and meters in the field. One or more servers, such as Supervisory Control And Data Acquisition (SCADA) servers, gather and store data from one or more field devices. Remote polling interfaces (RPI) provide a secure transport from the SCADA servers to processing and storage elements of the present embodiments. Data gathered from a plurality of heterogeneous SCADA servers are normalized and consolidated into one or more databases for subsequent processing and presentation, thereby collecting and unifying data from a plurality of heterogeneous sources into a device-agnostic and unified presentation for user viewing and interaction.

20 Claims, 3 Drawing Sheets

○ Browser Window □ ☐ ⊠

File Edit View Tools Properties Help

SCADALYNX  
Intelligent Automation

Monday October 6th, 2008  
ACME Oil and Gas (Memos)  
Logoff

Reporting | Roll-up Variance | Admin

Summary Listing

Rollup Analysis for 'Rollup Variance'

Variance Report: Total Daily Flow Rollup Target Analysis ▼

| Name | Current Value | Target Value | Variance | Memo | Links |
|---|---|---|---|---|---|
| ⊞Roll Up Variance | 83,336.57 | 65,000.00 | 18,336.57 (28.21%) | | 📧 ↻ |
| ⊞Fields | 83,336.57 | | | | 📧 ↻ |
| ⊞New Mexico | 23,036.00 | 20,000.00 | 3,036.00 (15.18%) | | 📧 |
| ⊞Farmington | 12,290.00 | | | | 📧 |
| ⊞Ignacio | 5,192.00 | | | | 📧 ↻ |
| ⊞Red River | 7,360.00 | | | | 📧 |
| ⊞Oklahoma | 28,441.44 | 18,000.00 | 10,441.44 (58.01%) | | 📧 |
| ⊞Anadarko | 6,186.29 | | | | 📧 |
| ⊞Arkoma | 8,420.57 | | | 8/15/2007: ... | 📧 |
| ⊞Eufala | 7,886.95 | | | | 📧 |
| ⊞Osage | 5,947.63 | | | | 📧 ↻ |
| ⊞Texas | 28,225.22 | 25,000.00 | 3,225.22 (12.90%) | | 📧 |
| ⊞Bethany | 2,303.27 | | | | 📧 |
| ⊞Carthage | 11,187.76 | | | | 📧 |
| ⊞Willow Springs | 9,932.36 | | | | 📧 |
| ⊞Zapata | 4,801.83 | | | | 📧 |
| ⊞Wyoming | 3,633.91 | 2,000.00 | 1,633.91 (81.70%) | | 📧 ↻ |

Ready                                                                                              Loaded 45 of 45

CLASSIFICATION AND WEB-BASED PRESENTATION OF OIL AND GAS SCADA DATA

BACKGROUND

1. Field

Invention relates generally to data processing, and in particular to a system for device-agnostic acquisition, processing and presentation of data produced by one or more devices and meters in the field.

2. Related Art

Supervisory Control And Data Acquisition (SCADA) systems gather and store data from field devices and make such data available for acquisition, processing and presentation to users. However, while SCADA systems gather and store a variety of information about and from field devices, typically only a fraction of the usable information is presented and made available to users.

This may be so for a variety of reasons: some useful data may not be captured; some useful data may not be properly characterized; some useful data may be trapped in a proprietary database that limits distribution and analysis; etc. As a result, key decision-makers operate in a context of too little information, inaccurate information, or information that is old or stale.

Therefore, there is a need for a system that provides access to real-time field production information, provides data that is continually up to date, provides data in an easy to read fashion to users, provides data that is consistent across the company, and presents the data in the most usable form for each user, enabling production analysis as well as real-time production surveillance and control.

SUMMARY

Disclosed are techniques for acquiring, processing and presenting data produced by one or more devices and meters in the field. One or more servers, such as Supervisory Control And Data Acquisition (SCADA) servers, gather and store data from one or more field devices or meters. Remote polling interfaces (RPI) provide a secure transport from the SCADA servers to processing and storage elements of the present embodiments. Data gathered from a plurality of heterogeneous SCADA servers are normalized and consolidated into one or more databases for subsequent processing and presentation, thereby collecting and unifying data from a plurality of heterogeneous sources into a device-agnostic and unified presentation for user viewing and interaction.

BRIEF DESCRIPTION OF DRAWINGS

FIG. 2 illustrates an example user interface showing a hierarchical view of key performance data, such as production and pressure.

FIG. 3 illustrates an example user interface showing a mapping interface which may present wells, compressors, tanks, or other device types that have been entered into the system.

DETAILED DESCRIPTION

Figure 1:
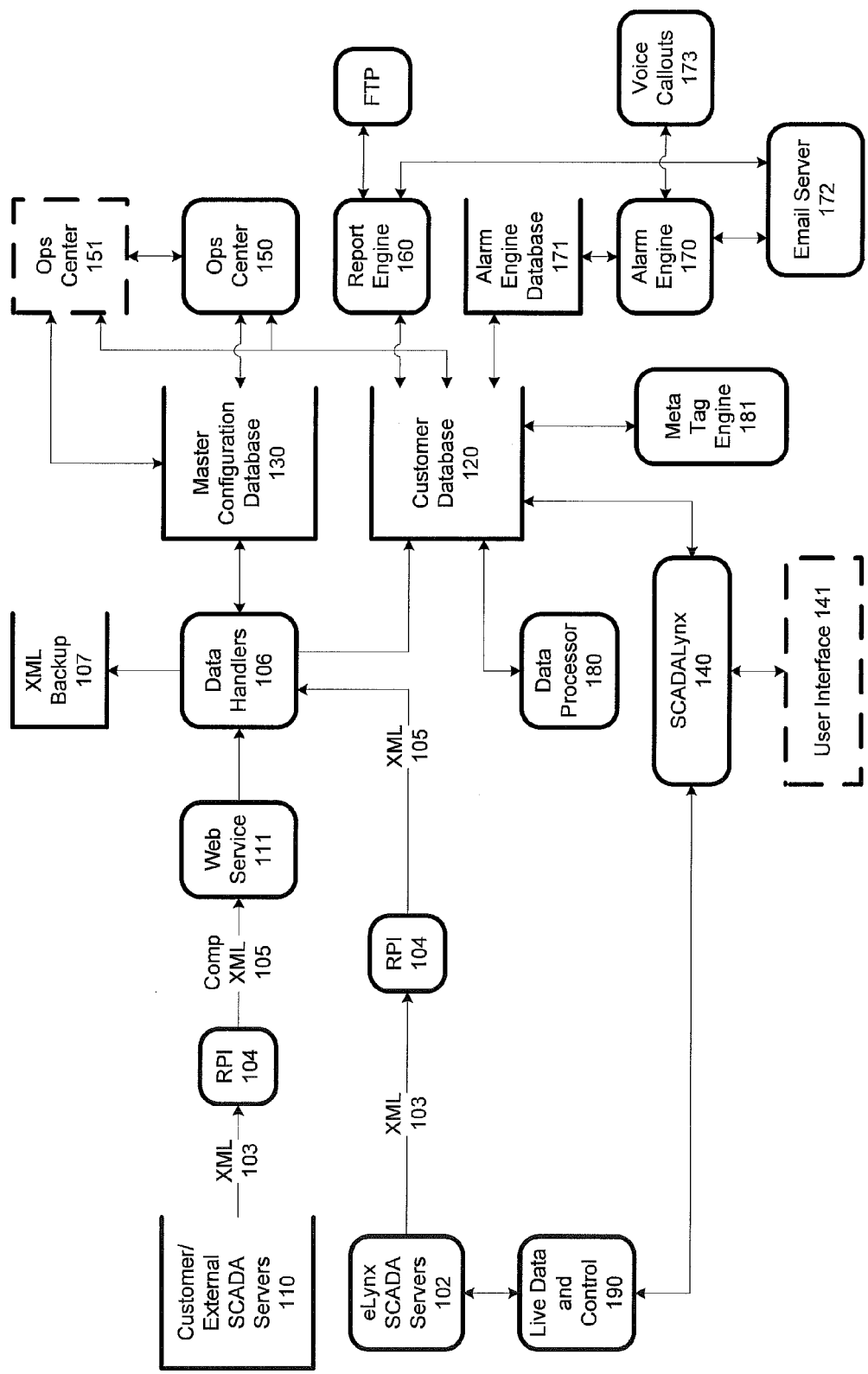
FIG. 1 is a block diagram illustrating a system for acquiring, processing and presenting data produced by one or more devices and meters in the field.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Disclosed are systems, methods and techniques for acquiring, processing and presenting data produced by one or more heterogeneous devices and/or meters in an oil or gas field. One or more servers, such as Supervisory Control And Data Acquisition (SCADA) servers, gather and store data from the one or more field devices or meters. Remote polling interfaces (RPI) provide a secure transport from the SCADA servers to one or more processing and storage elements of the present embodiments. Data gathered from a plurality of heterogeneous SCADA servers are normalized according to a common set of device-agnostic data types and data values, and are consolidated into one or more databases for subsequent processing by one or more computers, for storage on one or more computer-readable media, and/or for presentation using visual displays or other graphical representations. The systems and methods thereby provide for collecting and unifying data from a plurality of heterogeneous sources into a device-agnostic and unified presentation for user viewing and interaction.

FIG. 1 illustrates a system in accordance with an embodiment of the present invention. In an oil or gas field, one or more polling servers poll one or more field devices or meters for values (not shown in FIG. 1). Field devices and meters are typically situated in remote locations and may be battery or solar powered. Field devices may communicate with polling servers using a wireless communication network, frame relay data lines, modems, or other such forms of communication.

Once a batch of such field data is acquired, the polling servers send the polled data values to one or more SCADA servers 110. The SCADA servers are thereby able to gather data in real time from remote locations in order to monitor or control equipment and conditions. Generally, SCADA servers 102 reside at customer sites and on customers' own private networks.

The polled data may comprise a variety of information such as meter flow, meter pressure, device battery voltage, device temperature, and the like. Polled data values have identifiers which identify the particular meter or device that originated the particular piece of data, a numerical value indicating the actual measured quantity, and a time stamp indicating the time of the measurement. The polling engines comprise logic for obtaining this data from the field meters and field devices. The SCADA servers 110 in turn obtain this data from the polling engines.

One or more Remote Polling Interfaces (RPI) 104 are configured to communicate with the one or more SCADA servers 110. An RPI 104 comprises software running on an application server which communicates with a SCADA 110 server. This level of indirection from the field meters and devices to the RPIs 104 exists because the operators of the RPIs 104 may not necessarily have access to the actual devices and meters out in the field. There may be various owners, operators or working interests who may not be interested in allowing unrestricted third-party access to their hardware devices out in the field. However, such owners, operators or working interests do interface with their devices and meters via one or more polling engines which store polled data values into their own internal memory or database. The operators of the RPIs 104 receive permission to extract data values out of such polling engine databases.

An RPI 104 preferably provides a secure transport mechanism (for example using a cryptographically secured communication protocol) for SCADA data and initiates the data polling from the SCADA servers 110 with which it communicates. An RPI 104 can integrate data from a plurality of heterogeneous SCADA servers 110 and facilitate consolidation of that data into one database. Furthermore, the techniques of the present invention are not limited to communicating and interfacing with SCADA servers 110. The presented techniques work with any server that stores data and allows the export of such data to an RPI 104 for the gathering and consolidation of such data, as described herein.

In one embodiment, an RPI 104 periodically wakes up and makes requests of one or more SCADA servers 110 for new data values since the last request. Upon acquisition of such data values (if any), the RPI 104 packages the data into a pre-determined format, for example in an eXtensible Markup Language (XML) format (if the data is not already in such format). This binding of the received data to its origin (i.e. to the originating SCADA servers, or to the originating field meters or devices) and the packaging of the data are herein referred to as "snapshotting" the data. The packaged data is for consumption by one or more data handlers 106. The RPI 104 optionally further compresses and encrypts the received data prior to sending the data to a data center via a secure transport, such as via a secure web service provider 111.

Optionally, an operations center 150 is provided to serve as an internal administrative tool for the setup and configuration of new devices or meter in the field. When a new device or meter is installed in the field, technicians at the operations center 150 store into an XML file (or other suitable storage or format) information about the device or meter (for example device or meter ID, device or meter location, device or meter owner, etc.), the type of data values originating from the device or meter, any identifying tags that are to be associated with data values originating from that device or meter.

Advantageously, at the time when the system 120 is set up to receive data from a new device or meter, the type of the incoming data is stored in a configuration database 130 and is associated with the device or meter. This allows future interpretation and tagging of incoming data values from that particular device or meter. Furthermore, this allows the present embodiments to operate in a device or meter-agnostic fashion and gather and process data originating from a heterogeneous set of field meters and devices. As described above, when incoming data arrives, it is accompanied by sufficient information to indicate not just the data values, but also time stamps and data origin.

Once the data passes through the web service provider 111, the reverse processing is performed on the data: the data is decrypted and uncompressed (if needed) and is subsequently consumed by one or more data handlers 106.

Data handlers 106 process the incoming data to determine which one or more customers are to receive the data. This information is indicated in a master configuration database 130. Once a data handler 106 determines the customers, it simply writes the data into the corresponding customer databases 120. Optionally, once a data handler 106 processes received data, it also creates a backup 107 of it.

As described above, incoming data values comprise an ID identifying the originating device, a data value, and a time stamp. An ID may comprise a serial number for the originating device or meter, or any other suitable identifier uniquely identifying the device or meter. The device ID is used to look up, in the master configuration database 130, any tags that are to be applied to the data originating at this device. Such tags describe the types of the data values.

For example, a field device with ID #1234 may produce the incoming data value 25 accompanied by a time stamp of Jan. 1, 2008, 10 am. Looking up this ID in the database 130, as well as any subsequent lookups in customer database 120, may indicate for example that the device identified by ID #1234 produces data values that indicate pump pressure. From this information, it is concluded that the incoming data indicates a pressure of 25 psi at pump #1234 at 10 am on Jan. 1, 2008.

Aside from identifying the types of incoming data values, the database also indicates the customers associated with a particular device, based on the device ID. This allows incoming data values to be grouped by customer, allowing the customer to view all or portions of their device data via one convenient user interface over a secure network, such as served by a secure web server over the Internet or over a private network, as further described below.

Values obtained from the field are tagged according to their general data type, even when they originate from different meters with different configurations or manufacturers. For example, battery voltages coming in from the field on particular meters manufactured by different manufacturers may differ in their incoming format, but they may be tagged as a certain battery "type" to provide consistency. As another example, a first meter manufactured by a first manufacturer may refer to the flow for the previous day as "Production Yesterday," while a second meter manufactured by a second manufacturer may refer to the same flow for the previous day differently as "Previous Data Flow," but they may be consistently tagged as "Previous Day Flow" in order to standardize the incoming data. Such data "type" tags provide a consistent set of data types for the data set and thereby create a context for the gathered pieces of incoming data. This allows for type-based aggregations, comparisons and/or analyses to be performed on data coming in from a wide range of meters in an "apples to apples" manner that provides data consistency and makes such aggregations, comparisons and/or analyses meaningful. This is referred to herein as "data normalization" and adds business knowledge to otherwise raw data coming in from the field. Data normalization, as referred to herein, provides a context for supporting and making higher-level business decisions that conventional meter-centric systems do not provide.

Optionally, prior to classifying incoming data (comprising data values, time stamps, data origin) into the appropriate databases, a data handler 106 validates the incoming data to sift out corrupted data, such as a −5,000,000 psi pressure reading on a pump in the field.

Once an incoming piece of data has been received, processed and inserted into a customer database 120, it can be viewed and interacted with via a server 140. A server 140 serves a set of one or more user interfaces 141, such as comprising web pages or other user interface technology as known to those of skill in the art. In one embodiment, the server 140 provides a web-based application for users to view and interact with the data. Users may view with the visual presentation using a computer display or screen or other visual presentation devices, and may interact with the data using computer keyboards, computer mice, touch screens, or any other input devices, as should be obvious to those of ordinary skill in the art.

In contrast to a conventional meter-centric or device-centric user interface and data presentation, the embodiments of the present invention provide a higher-level view of the customers' data. While a conventional meter-centric user interface presents data from one meter at a time, the present embodiments provide group-centric or hierarchy-centric data views. This provides group-level collections of meters or devices and allows users to see data at the field-level or at the division-level with respect to the customer's business hierarchy. Such a business hierarchy may comprise parent companies, child companies, subsidiaries, divisions, and so forth.

FIG. 2 illustrates an example "Rollup Variance" user interface, showing a hierarchical view of key performance data, such as production and pressure, which can be used for surveillance and/or for drill-down reviews. Variance analysis can be performed against prior period averages and/or against imported corporate targets. When a variance is noted, the user may quickly drill down from field to well to device in order to identify and resolve the problem.

Figure 3:
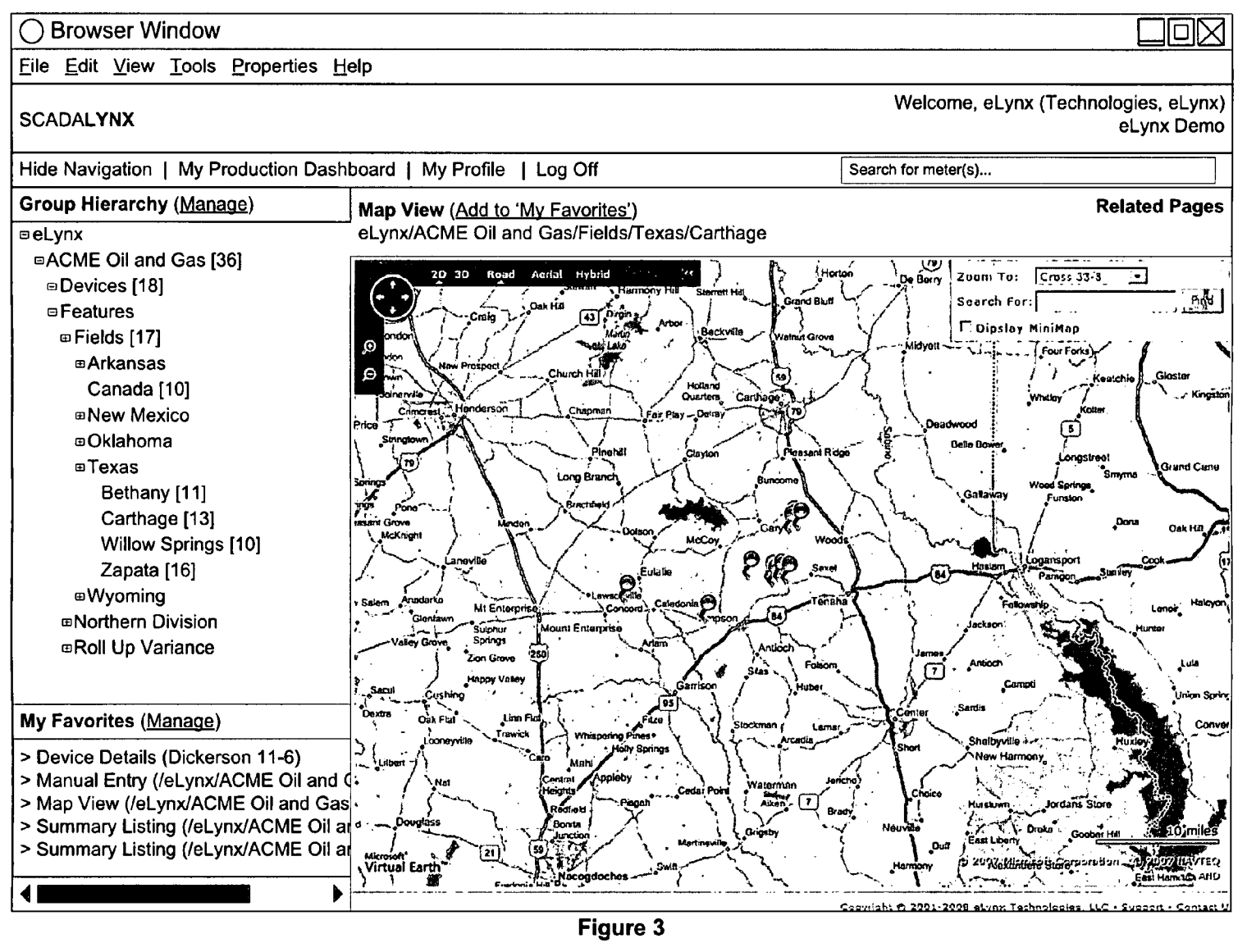

FIG. 3 illustrates an example "Mapping Interface" user interface. Wells, compressors, tanks, or other device types whose locations have been entered into the system will be available on the map view. The locations may be entered using Global Positioning System (GPS) coordinates, or using any other known methods for indicating locations on a geographical map. Optionally, the Mapping Interface displays key performance data when a user mouses over, or otherwise indicates, a corresponding icon or designator (such as a pushpin icon) on the map.

An advantageous result of the above data processing is that many details involved in the collection of field data are abstracted from the users who view the data. Such details include the particulars of the data centers that house the data values, particular differences between field devices and field meters manufactured by different manufacturers, particular pieces of hardware or software or protocols involved in getting the data values from the field to the databases, etc. This is in contrast to conventional systems that are hardware specific, polling interface or polling driver specific, or otherwise specific to particular technologies or origins or transports which, while present, are not of primary interest to a user who is primarily interested in gaining visibility into the data.

A report engine 160 uses information stored in the customer databases 120 to import or export data. This allows distribution of customized reports to customers based on data from associated customer databases 120. Advantageously, the report may be based on normalized data, as described above, thereby allowing the report to group and present similar data consistently and thereby provide a standardized and unified view. Normalized data may be characterized based upon oil and gas contract day.

An alarm engine 170 references an alarm engine database 171 indicating one or more triggers for customer notification, such as one or more user-configured setpoints indicating trigger or alarm conditions based on the data. When a trigger is activated, the alarm engine 170 causes a notification to be sent out. For example, the alarm engine 170 may cause an email server 172 to send one or more email messages to customers alerting them to the fact that one or more trigger conditions have been activated. Alternatively, alarm engine 170 may use a voice callout mechanism 173 (e.g. a text-to-speech robotic voice service) to communicate the trigger activation to the customer, or may generate fax messages, text messages, or other types of notification.

As data handlers 106 process and insert data into customer databases 120, they invoke logic that checks whether the data that is about to be inserted into a database is outside of set alarm thresholds. If so, the data handler 106 communicates that with the alarm engine 170. In one embodiment, the data handlers 106 and the alarm engine 170 communicate via a database, with the data handlers 106 inserting events into the database which indicate incoming values that are outside of alarm thresholds, and the alarm engine 170 periodically checks the database for new database entries and processes their alarms. Some alarm examples include battery voltage thresholds, pressure thresholds, and flow-rate thresholds.

A data processor 180 comprises a number of processes for continually processing the incoming data. One such process is the meta tag engine 181. The meta tag engine 181 stores and generates data about incoming data values. Examples of tags include battery level, flow rate, pressure, tubing, casing, etc. As raw values arrive from the meters in the field, the meta tag engine 181 inspects the values and determines whether the values should be included in a computation. Examples of such computations include historic measurements such as periodic low, average values or high/low values.

Other such engines may include a calculated tag engine, for performing configurable calculations based on associated tag values and storing the results as calculated tags, thereby providing historical rollup and/or other statistical or aggregate values. Another example of an engine is a communications monitor engine, for monitoring a given customer's data and sending alerts when such data has become stale or has not been updated in a predetermined period of time, thereby proactively alerting the system and/or operators of the system when expected data updates are not being received. Such alerts typically point to potential issues in the field.

For example, a tag may periodically summarize incoming pressure values into a daily low, average and high value for pressure. Such tags save the effort of recomputing such values at later dates. The period of such tag computations may depend on service level agreements with customers for particular meters or devices in the field.

Optionally, a statistical analysis engine performs predictive root cause analysis on incoming data. In one embodiment, the statistical analysis engine considers historical data and/or signatures, and assigns probabilities to the presence of problems at particular meters in the field. The analysis engine is designed to detect common well problems such as well loading, low flow due to pressure interference, and well loading from fill. The statistical analysis engine allows a user to specify one or more of: a physical scope, a monitoring time series, an application scope, and an application scope for the analysis. These will be presently described.

The physical scope of an analysis may be for a device, a group of devices, a field, or for other such collections of devices. The time series specification may be for a raw data capture frequency, such as per data tick, hourly, daily, weekly, or other such interval, thereby normalizing the data according to a chosen time interval. When capturing data for such an interval, a capture rollup operator may be used, examples of which include taking the minimum, maximum, sum, or average of the captured data. The frequency of the time series itself may be specified as well, for example by having the time series be captured on an hourly, daily, monthly, or other interval basis. One or more parameters may be specified for the time series, with example parameters including pressure, volume, ratio of pressure to volume, or other such parameters.

Time series start and end points may be specified as well. Starting points may be specified in terms of absolute date and time, or in terms of a specified number of intervals ago. End times may be specified in terms of absolute date and time as well, or in terms of a specified number of intervals ago, or be marked by the last data point. The user may specify which results of the time series are to be monitored and optionally visually represented (for example plotted graphically and displayed on a monitor). Such definitions may be named and saved for subsequent reference. Note that such a specification may comprise a single data point, or a plurality of data points.

Once a physical scope and a time series have been specified, the user may further specify a comparison basis, which may be another time series or a set of absolute numbers. Once a comparison basis is specified, the user may further select a standard of difference, which may be comprise an absolute difference, a percent increase, a percent decrease, or a probability of difference. Lastly, the user may choose one or more alarm types and parameters to be triggered by the statistical analysis engine. The statistical analysis engine may then be activated with the specified parameters.

Optionally, the system comprises one or more live data and control servers 190 for allowing users of the system to write data back into field meters or devices, thereby providing control over the operation of field devices. Advantageously, such remote controlling of meters in the field can be done via an interface provided by one or more web servers to users. A further advantage is that one or more SCADA servers can be communicated with and controlled via a unified web interface, thereby unifying the monitoring and control of SCADA servers and field meters.

As described above, the disclosed methods and techniques may be implemented using computer systems. Such computer systems may comprise memory elements for storing instructions read from computer readable media and executable by a processor or other such controller. The computer systems may comprise communication subsystems for communicating with other systems over wired or wireless connections, as well as input/output (I/O) devices such as computer keyboards, computer mice, track balls, pointing devices, computer displays or screens, graphics subsystems, printers, and any other such peripheral devices or systems as should be known to those of ordinary skill in the art. The present systems may communicate with mobile devices to get input from user and/or to provide the above-described visual, textual, or auditory outputs to users.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

We claim:

1. A computer implemented method for real-time acquisition, classification, and presentation of Supervisory Control And Data Acquisition (SCADA) data originating from a plurality of field meters or devices in an oil or gas field, comprising:

receiving oil or gas data from a plurality of heterogeneous SCADA servers, wherein the oil or gas data originate from the plurality of field meters or devices in the oil or gas field, and wherein the heterogeneous SCADA servers are configured to obtain the oil or gas data from the plurality of field meters or devices via at least one of a wireless communication network, frame relay data lines and a single or plurality of modems;

normalizing the data comprising standardizing the incoming data according to a set of data types and corresponding data values such that a consistent set of data types and values enables creating a context for gathered incoming data and allows for at least one of aggregations, comparisons and analyses to be performed on incoming data;

storing the normalized data into a database for subsequent processing; and presenting the normalized data to a user using a visual interface;

thereby allowing the user to obtain a unified, device or meter agnostic visual presentation of data obtained from a plurality of heterogeneous SCADA servers and originating from a plurality of field meters or devices in the oil or gas field.

2. The method of claim 1, wherein the oil or gas data comprise (a) measurement values measured by the field devices or meters, (b) measurement time stamps, and (c) data origins indicating the corresponding field devices or meters originating the measurement values.

3. The method of claim 2, wherein the measurement values comprise device or meter pressure values, device or meter flow values, device or meter temperature values, or device or meter production levels.

4. The method of claim 3, wherein the data types indicate at least one of pressure, flow, temperature, and production level.

5. The method of claim 4, wherein the normalizing comprises tagging the oil or gas data in order to standardize the oil or gas data according to the data types.

6. The method of claim 5, wherein the normalizing further comprises converting one or more measurement values so that they are consistent with their corresponding data types.

7. The method of claim 6, further comprising:
performing a lookup in a configuration database in order to determine one or more customers who have purchased a subscription to receive the oil or gas data; and
storing the received oil or gas data into a database for the customers.

8. The method of claim 6, further comprising:
aggregating the normalized data according to the data types.

9. The method of claim 1, wherein the visual interface presents the oil or gas data according to a presentation hierarchy.

10. The method of claim 9, wherein the presentation hierarchy is according to groups of devices or meters in the oil or gas field.

11. The method of claim 9, wherein the presentation hierarchy is based on the user's business hierarchy.

12. The method of claim 1, wherein the visual interface comprises shows a comparison of a current measurement period against a past period or against a corporate target, thereby allowing the user to perform variance analysis.

13. The method of claim 1, wherein the visual interface comprises a map view showing locations of one or more field devices or meters on a geographical map.

14. The method of claim 1, further comprising:
allowing the user to set one or more notification triggers based on the normalized data, in order to notify the user when the normalized data meet one or more user-defined conditions.

15. The method of claim 1, wherein the receiving comprises obtaining the oil or gas data from one or more remote polling interfaces that are in communication with the SCADA servers.

16. The method of claim 15, wherein the remote polling interfaces are configured to periodically make requests of the SCADA servers for new data values.

17. The method of claim 16, wherein the remote polling interfaces are further configured to time stamp the new data values, bind them to their respective origins, and package them into a pre-determined format for recipients.

18. The method of claim 17, wherein the pre-determined format is an eXtensible Markup Language (XML) format.

19. The method of claim 17, wherein the remote polling interfaces are further configured to compress and encrypt the new data prior to making the new data available to recipients.

20. A system for real-time acquisition, classification, and presentation of Supervisory Control And Data Acquisition (SCADA) data originating from a plurality of field meters or devices in an oil or gas field, comprising:
- a processor; and
- a memory element for storing a set of instructions stored on a computer readable medium and executable by the processor, the instructions for:
  receiving oil or gas data from a plurality of heterogeneous SCADA servers, wherein the oil or gas data originate from the plurality of field meters or devices in the oil or gas field, and wherein the heterogeneous SCADA servers are configured to obtain the oil or gas data from the plurality of field meters or devices via at least one of a wireless communication network, frame relay data lines and a single or plurality of modems;
  normalizing the data comprising standardizing the incoming data according to a set of data types and corresponding data values such that a consistent set of data types and values enables creating a context for gathered incoming data and allows for at least one of aggregations, comparisons and analyses to be performed on incoming data;
  storing the normalized data into a database for subsequent processing; and
  presenting the normalized data to a user using a visual interface;
  thereby allowing the user to obtain a unified, device or meter agnostic visual presentation of data obtained from a plurality of heterogeneous SCADA servers and originating from a plurality of field meters or devices in the oil or gas field.

* * * * *